[11] 3,575,082

- [72] Inventor Gilbe Roch
- [21] Appl. No. 739,290
- [22] Filed June 24, 1968
- [45] Patented Apr. 13, 1971
- [73] Assignee Eastman Kodak Company Rochester, N.Y.

- [54] ALBADA VIEWFINDER HAVING THREE LENS COMPONENTS
  2 Claims, 1 Drawing Fig.
- [52] U.S. Cl.................................................. 88/1.5, 350/225
- [51] Int. Cl....................................................... G03b 13/08

........................... 88/1.5; 350/225

[56] References Cited
UNITED STATES PATENTS
2,923,196  2/1960  Papke.......................... 88/1.5

*Primary Examiner*—Ronald L. Wibert
*Assistant Examiner*—Orville B. Chew, II
*Attorneys*—Robert W. Hampton and William F. Delaney, Jr.

ABSTRACT: An Albada viewfinder comprising a negative aspheric objective and a positive eyepiece between which is located a positive meniscus element having on its rear surface a mirror for forming a virtual image of a reticle mark.

Patented April 13, 1971
3,575,082
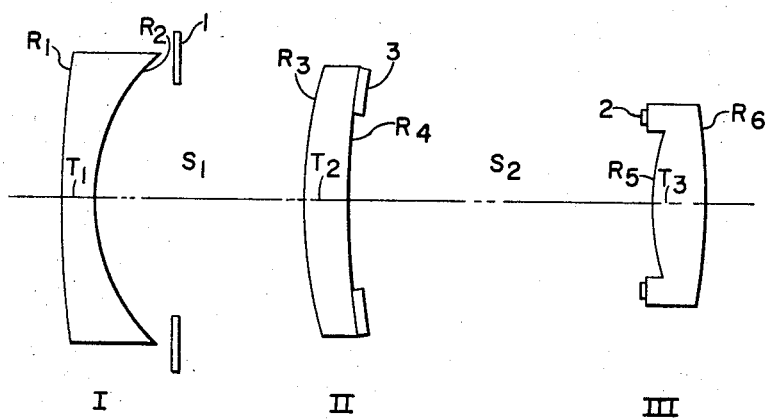
G. WILLIAM McCLUNE
INVENTOR.
BY William F. Delany Jr
Robert W Hampton
ATTORNEYS

ALBADA VIEWFINDER HAVING THREE LENS COMPONENTS

BACKGROUND OF THE INVENTION

This invention relates to Albada-type viewfinders, and more particularly to Albada viewfinders having three elements with a reflective coating on a portion of a surface of the middle element for forming an image of a reticle.

Projected frame viewfinders are well known and are often referred to as Albada viewfinders. In such systems a virtual image of a reticle line is projected at infinity by a mirror to provide a field frame appearing in the plane of the viewed object. Such projected frame systems are particularly adapted for use in reversed Galilean viewfinders, in which a negative objective forms a virtual image of the field which is viewed through an eyepiece. Since the virtual image appears in front of the system, a frame cannot be located in the image plane. The Albada viewfinder solves this problem by projecting a frame image in the virtual image plane of the objective. The frame-projecting means is a curved mirror that creates a virtual image substantially at infinity of a reflective reticle, which is illuminated through the viewfinder objective. For some applications the viewfinder elements are sufficiently close to each other for the reticle to be located on the eyepiece element and for the reflective surface to be a semireflective coating on the rear surface of the negative objective. However, there are many other applications of this type of viewfinder with a greater separation between the two elements in which case either the reticle or the reflective surface is usually supported independently of the objective or the eyepiece. The independent mounting of the reflecting surface or the reticle requires rather close alignment tolerances to avoid interferring with the viewfinder optics and to insure correct framing of the field. For example, one method of mounting the reflective surface independently of the optical elements is to provide a curved mirror having a central portion cut out to permit the passage of viewfinder image light. However, the manufacture of such mirrors is complicated by their tendency to warp. On the other hand, if the mirror is coated on a transparency plate to avoid warping, the optics viewfinder system may be adversely affected. These difficulties can be overcome by providing an additional lens element in the viewfinder with the mirror coated on one of its surfaces.

SUMMARY OF THE INVENTION

This invention provides an Albada-type viewfinder comprising a negative objective and a positive eyepiece, between which is located an additional lens element having a reflective coating on a portion of the rear surface thereof. This additional element provides a solid surface on which the reflective mirror can be coated without warping problems, and it also provides additional parameters with which to improve the optical characteristics of the system. For example, the additional middle element may be employed to change the magnification of the basic system, or the power of the middle element may e used to compensate for its own presence in the system so that it may be included without increasing aberrations or extending the overall length of the viewfinder.

BRIEF DESCRIPTION OF THE DRAWINGS

The drawing is a cross-sectional view of an Albada-type viewfinder according to one embodiment of the invention.

DETAILED DESCRIPTION OF THE DRAWING

In the drawing a reversed Galilean viewfinder is shown having a negative aspheric objective I and a biconvex positive eyepiece III, between which is located a positive meniscus element II. Positioned between the objective and the middle element is a mask 1. Near the eyepiece is located a reticle 2 in the focal plane of the mirror 3 coated on the rear surface of the middle lens element II. The mirror 3 may be a semireflective coating over the entire lens surface or it may be a fully reflective coating on a peripheral portion of the surface.

An example of a viewfinder according to the invention is given in the table below, wherein $R$, $T$ and $S$ refer respectively to the radii of curvature of the lens and mirror surfaces, the thicknesses of the lens elements and the spacings between the elements, numbered by subscript from front to rear and wherein all three lens elements can be made of plexiglass having an index of refraction for the $D$ line of the spectrum of substantially 1.49 and a power of dispersion of substantially 57.4.

EXAMPLE
[Magnification=.426X]

| Elements | Radii (inches) | Thickness and spacings (inches) |
|---|---|---|
| Objective I | $R_1=9.349$ | $T_1=.070$ |
|  | $R_2=$aspheric |  |
|  |  | $S_1=.415$ |
| Lens II | $R_3=1.935$ | $T_2=.060$ |
|  | $R_4=2.248$ |  |
|  |  | $S_2=.605$ |
| Eyepiece III | $R_5=1.103$ | $T_3=.075$ |
|  | $R_6=-6.605$ |  |

In the preferred embodiment of the invention $R_2$ has a polar radius of 2.72 inches and is aspherical as defined by the equation $X=1.360169Y^2+0.714572Y^4$, using $X$ and $Y$ in Cartesian coordinates for any point on the surface $R_2$ with respect to an origin at the center of the surface intersecting the optical axis which corresponds to the $X$-axis of the coordinates.

The invention has been described in detail with particular reference to preferred embodiments thereof, but it will be understood that variations and modifications can be effected within the spirit and scope of the invention as described hereinabove and as defined in the appended claims.

I claim:

1. An Albada-type viewfinder comprising from front to rear a negative objective, a positive meniscus middle element concave toward the rear and a rear positive biconvex eyepiece, wherein the lens elements have substantially the following characteristics and spatial relations in which the lens elements are numbered from the front, $R$, $T$ and $S$ refer respectively to the radii of curvature of the lens surfaces, the thicknesses of the lens elements and the spacings between the lens elements, numbered by subscript from front to rear, and wherein the lenses have an index of refraction for the $D$ line of substantially 1.49 and a power of dispersion of substantially 57.4:

| Elements | Radii (inches) | Thicknesses and spacing (inches) |
|---|---|---|
| Objective I | $R_1=9.35$ | $T_1=.07$ |
|  | $R_2=$aspheric [1] |  |
|  |  | $S_1=.42$ |
| Lens II | $R_3=1.94$ | $T_2=.06$ |
|  | $R_4=2.25$ |  |
|  |  | $S_2=.61$ |
| Eyepiece III | $R_5=1.10$ | $T_3=.08$ |
|  | $R_6=-6.61$ |  |

[1] With a polar radius of 2.72.

2. An Albada-type viewfinder comprising from front to rear a negative objective, a positive meniscus middle element concave toward the rear and a rear positive biconvex eyepiece, a reticle adjacent said eyepiece, and at least a portion of the rear surface of said positive meniscus middle element being coated with a reflective layer for forming a curved mirror facing said reticle to form a virtual image plane of said objective, wherein the lens elements have substantially the following characteristics and spatial relations in which the lens elements are numbered from the front, $R$, $T$ and $S$ refer respectively to the radii of curvature of the lens surfaces, the thicknesses of the lens elements and the spacings between the lens elements, numbered by subscript from front to rear, and wherein the lenses have an index of refraction for the $D$ line of substantially 1.49 and a power of dispersion of substantially 57.4:

| Elements | Radii (inches) | Thicknesses and spacing (inches) |
| --- | --- | --- |
| Objective I | $R_1 = 9.35$ | $T_1 = .07$ |
|  | $R_2 =$ aspheric |  |
|  |  | $S_1 = .42$ |
| Lens II | $R_3 = 1.94$ | $T_2 = .06$ |
|  | $R_4 = 2.25$ |  |
|  |  | $S_2 = .61$ |
| Eyepiece III | $R_5 = 1.10$ | $T_3 = .08$ |
|  | $R_6 = -6.61$ |  | wherein $R_2$ is aspheric according to the following equation: $X = 1.36 Y^2 + 0.71 Y^4$; where $Y$ is the distance of a point on the surface from the axis of the lens and $X$ is the distance of the same point from a plane passing through the vertex of the aspheric surface perpendicular to the axis of the lens.